US012039561B2

(12) United States Patent
Keski-Valkama (10) Patent No.: US 12,039,561 B2
(45) Date of Patent: Jul. 16, 2024

(54) METHOD, APPARATUS, AND COMPUTER PROGRAM PRODUCT FOR IDENTIFYING AND COMPENSATING CONTENT CONTRIBUTORS

(71) Applicant: HERE Global B.V., Eindhoven (NL)

(72) Inventor: Tero Juhani Keski-Valkama, Zürich (CH)

(73) Assignee: HERE GLOBAL B.V., Eindhoven (NL)

( * ) Notice: Subject to any disclaimer, the term of this patent is extended or adjusted under 35 U.S.C. 154(b) by 941 days.

(21) Appl. No.: 16/362,876

(22) Filed: Mar. 25, 2019

(65) Prior Publication Data
US 2020/0311757 A1    Oct. 1, 2020

(51) Int. Cl.
*G06Q 30/0217* (2023.01)
*G06N 3/08* (2023.01)
*G06N 5/046* (2023.01)
*G06N 20/10* (2019.01)
*G06Q 30/0207* (2023.01)

(52) U.S. Cl.
CPC .......... *G06Q 30/0217* (2013.01); *G06N 3/08* (2013.01); *G06N 5/046* (2013.01); *G06N 20/10* (2019.01); *G06Q 30/0239* (2013.01)

(58) Field of Classification Search
CPC .......... G06Q 30/0217; G06Q 30/0239; G06Q 10/067; G06N 3/08; G06N 5/046; G06N 20/10
USPC ............................................ 705/14.19, 14.39
See application file for complete search history.

(56) References Cited

U.S. PATENT DOCUMENTS

| | | | |
|---|---|---|---|
| 9,461,958 B1* | 10/2016 | Green | H04L 51/52 |
| 9,489,697 B1* | 11/2016 | Guerrieri | G06Q 40/10 |
| 10,360,482 B1* | 7/2019 | Khare | G06K 9/6227 |
| 2015/0242447 A1* | 8/2015 | Ipeirotis | G06F 16/215 |
| | | | 705/14.45 |
| 2018/0284735 A1* | 10/2018 | Cella | G05B 19/41865 |

(Continued)

OTHER PUBLICATIONS

X. Ji, D. Zhao, H. Yang and L. Liu, "Exploring Diversified Incentive Strategies for Long-Term Participatory Sensing Data Collections," 2017 3rd International Conference on Big Data Computing and Communications, 2017, pp. 15-22, <https://ieeexplore.ieee.org/document/8113042/references#citations> (Year: 2017).*

(Continued)

*Primary Examiner* — Ilana L Spar
*Assistant Examiner* — Melinda Gieringer
(74) *Attorney, Agent, or Firm* — ALSTON & BIRD LLP (57) ABSTRACT

A method, apparatus and computer program product are provided to incentivize crowd sourcing of data by identifying and compensating content contributors based on a value of the content to training a neural network. Methods may include: receiving a request for a machine learning model trained from training data received from a plurality of data contributors, where the training data identified a contributor having provided the respective training data; processing the request for the machine learning model to infer a result based on a subset of training data relevant to the request; identifying one or more data contributors that provided the subset of training data relevant to the request; and providing compensation to the one or more data contributors that provided the subset of training data.

20 Claims, 7 Drawing Sheets

(56) References Cited

U.S. PATENT DOCUMENTS

2019/0138908 A1\* 5/2019 Bernat ................. G06N 3/0454
2019/0220919 A1\* 7/2019 Martinez .............. G07G 1/0036
2020/0042971 A1\* 2/2020 Eby ........................ G06Q 20/29

OTHER PUBLICATIONS

Dao. D. et al., *DataBright: A Data Curation Platform for Machine Learning Based on Markets and Trusted Computation*, ICML Workshop: Game-Theoretic Mechanisms for Data and Information (2018) 4 pages.

Kurtulmus, B et al., *Trustless Machine Learning Contracts; Evaluating and Exchanging Machine learning Models on the Ethereum Blockhain*, [online] [retrieved Oct. 31, 2018]. Retrieved via the Internet; <URL: https://algorithmia.com/research/ml-models-on-blockchain>. (2018) 17 pages.

Weng, J. et al., *DeepChain: Auditable and Privacy-Preserving Deep Learning With Blockchain-Based Incentive*, Journal of Latex Class Files, vol. 14, No. 8 (Aug. 2015) 16 pages.

*Decentralized Machine Learning*, White Paper, www.decentralizedml.com, (Dec. 31, 2017), 58 pages.

*Ocean Protocol; A Decentralized Substrate for AI Data & Services*, Ocean Protocol Foundation (Mar. 28, 2018) 51 pages.

\* cited by examiner

METHOD, APPARATUS, AND COMPUTER PROGRAM PRODUCT FOR IDENTIFYING AND COMPENSATING CONTENT CONTRIBUTORS

TECHNOLOGICAL FIELD

An example embodiment relates generally to crowd sourcing data and, more particularly, to identifying and compensating content contributors based on a value of the content to training a neural network.

BACKGROUND

Crowd-sourced data is used in many businesses to train machine learning models. The machine learning models are used as components of products or services such as, but not limited to: intelligent assistants, machine vision, and fully automated driving. In some cases, the machine learning model based service is provided to third parties with internet-based Application Program Interfaces (APIs) for the purpose of building derivative products and services.

When machine learning models are made available through an API, there may be fees associated with the use of the models, which can be fees on a per-request basis or available as a package deal. The machine learning model can also be used in specific use cases, such as but not limited to: targeted advertisement or making suggestions of restaurants, movies, entertainment, etc. When the machine learning model is used to target an advertisement, there may be revenue associated to click-throughs and final purchase decisions. In many cases, there may be some amount of generated revenue by the use of the machine learning model.

BRIEF SUMMARY

A method, apparatus and computer program product are provided in accordance with an example embodiment in order to identify data contributors to a machine learning model and to compensate data contributors to the machine learning model proportionally with the value and utility of the data provided by the data contributors. Embodiments described herein may provide an apparatus including at least one processor and at least one non-transitory memory including program code instructions. The computer program code instructions may be configured to, when executed, cause the apparatus to: receive a request for a machine learning model trained from training data received from a plurality of data contributors, where the training data identified a contributor having provided the respective training data; process the request for the machine learning model to infer a result based on a subset of training data relevant to the request; identify one or more data contributors that provided the subset of training data relevant to the request; and determine compensation to be provided to the one or more data contributors that provided the subset of training data.

According to some embodiments, causing the apparatus to identify the one or more data contributors who provided the subset of training data relevant to the request may include causing the apparatus to: identify one or more data contributors who provided the subset of training data relevant to the request; and identify a proportion of the subset of training data that each of the identified one or more contributors provided. Causing the apparatus to determine compensation to be provided to the one or more data contributors who provided the subset of training data may include causing the apparatus to: identify a value of the inferred result; identify a portion of the value for distribution to the one or more identified data contributors; and distribute the portion of the value for distribution proportionally to the one or more identified data contributors based on a proportion of the subset of training data that each of the identified one or more data contributors provided. A remainder of the value after distribution of the portion of the value for distribution is provided to at least one of transaction fees or a service provider of the machine learning model.

According to some embodiments, compensation may be provided in micro-transactions via cryptocurrency, where micro-transactions include transactions at a fraction of a unit of the cryptocurrency. Causing the apparatus to determine compensation to be provided to the one or more data contributors who provided the subset of training data may include causing the apparatus to: aggregate micro-transactions; and provide for distribution of the aggregated micro-transactions in response to the aggregate total of the micro-transactions satisfying a predetermined value. The apparatus may optionally be caused to record compensation to the one or more data contributors by blockchain ledger.

Embodiments described herein may provide a computer program product including at least one non-transitory computer-readable storage medium having computer-executable program code instructions stored therein. The computer-executable program code portions include program code instructions configured to: receive a request for a machine learning model trained from training data received from a plurality of data contributors, where the training data identified a contributor having provided the respective training data; process the request for the machine learning model to infer a result based on a subset of training data relevant to the request; identify one or more data contributors that provided the subset of training data relevant to the request; and determine compensation to be provided to the one or more data contributors that provided the subset of training data. The program code instructions to identify the one or more data contributors that provided the subset of training data relevant to the request may include program code instructions to: identify one or more data contributors who provided the subset of training data relevant to the request; and identify a proportion of the subset of training data that each of the identified one or more data contributors provided.

The program code instructions to determine compensation to be provided to the one or more data contributors who provided the subset of training data may include program code instructions to: identify a value of the inferred result; identify a portion of the value for distribution to the one or more identified data contributors; distribute the portion of the value for distribution proportionally to the one or more identified data contributors based on a proportion of the subset of the training data that each of the identified one or more data contributors provided. A remainder of the value after distribution of the portion of the value for distribution may be provided to at least one of transaction fees or a service provider of the machine learning model. Compensation may be provided via cryptocurrency, where micro-transactions include transactions at a fraction of a unit of the cryptocurrency.

The program code instructions to determine compensation to be provided to the one or more data contributors who provided the subset of training data includes program code instructions to: aggregate micro-transactions; and provide for distribution of the aggregated micro-transactions in response to the aggregate total of the micro-transactions satisfying a predetermined value. The computer program product may include program code instructions to record compensation to the one or more data contributors by blockchain ledger.

Embodiments of the present invention may provide a method including: receiving a request for a machine learning model trained from training data received from a plurality of data contributors, where the training data identified a contributor having provided the respective training data; processing the request for the machine learning model to infer a result based on a subset of training data relevant to the request; identifying one or more data contributors that provided the subset of training data relevant to the request; and determining compensation to be provided to the one or more data contributors that provided the subset of training data. Identifying one or more data contributors who provided the subset of training data relevant to the request may include: identifying one or more data contributors who provided the subset of training data relevant to the request; and identifying a proportion of the subset of training data that each of the identified one or more data contributors provided.

According to some embodiments, determining compensation to be provided to the one or more data contributors who provided the subset of training data may include: identifying a value of the inferred result; identifying a portion of the value for distribution to the one or more identified contributors; and distributing the portion of the value for distribution proportionally to the one or more identified data contributors based on a proportion of the subset of training data that each of the identified one or more data contributors provided. A remainder of the value after distribution of the portion of the value for distribution may be provided to at least one of transaction fees or a service provider of the machine learning model. Compensation may be provided in micro-transactions via cryptocurrency, where micro-transactions may include transactions at a fraction of a unit of the cryptocurrency. Determining compensation to be provided to the one or more data contributors who provided the subset of training data may include: aggregating micro-transactions; and providing for distribution of the aggregated micro-transactions in response to the aggregate total of the micro-transactions satisfying a predetermined value.

Embodiments of the present invention may provide an apparatus including: means for receiving a request for a machine learning model trained from training data received from a plurality of data contributors, where the training data identified a contributor having provided the respective training data; means for processing the request for the machine learning model to infer a result based on a subset of training data relevant to the request; means for identifying one or more data contributors that provided the subset of training data relevant to the request; and means for determining compensation to be provided to the one or more data contributors that provided the subset of training data. The means for identifying one or more data contributors who provided the subset of training data relevant to the request may include: means for identifying one or more data contributors who provided the subset of training data relevant to the request; and means for identifying a proportion of the subset of training data that each of the identified one or more data contributors provided.

According to some embodiments, the means for determining compensation to be provided to the one or more data contributors who provided the subset of training data may include: means for identifying a value of the inferred result; means for identifying a portion of the value for distribution to the one or more identified contributors; and means for distributing the portion of the value for distribution proportionally to the one or more identified data contributors based on a proportion of the subset of training data that each of the identified one or more data contributors provided. A remainder of the value after distribution of the portion of the value for distribution may be provided to at least one of transaction fees or a service provider of the machine learning model. Compensation may be provided in micro-transactions via cryptocurrency, where micro-transactions may include transactions at a fraction of a unit of the cryptocurrency. The means for determining compensation to be provided to the one or more data contributors who provided the subset of training data may include: means for aggregating micro-transactions; and means for providing for distribution of the aggregated micro-transactions in response to the aggregate total of the micro-transactions satisfying a predetermined value.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

Crowd-sourced data refers to any data which is generated and collected by third parties, typically individual people or devices that take part in the data collection scheme. The data can be, for example: imagery of objects, indoor and/or outdoor environments, video thereof, audio recordings, or the like. The data may optionally include: personal data such as global positioning system (GPS) tracks, service usage details, ratings of services, or environmental data collection such as visual data from a road network, weather data, building facades and addresses, or labeling work such as marking up craters in astronomical imagery, describing imagery in textual form, ground truth labeling in many machine learning training sets, or gathering information from the web or legal texts based on a query.

This crowd-sourced data may be acquired from individuals and/or devices by, for example, offering the individuals an incentive, such as some service or application in exchange for the data collected, paying some amount of money in exchange for the data, or providing notoriety to the contributor. For example, an application for a device may be a game that provides enjoyment to a user, where the user agreement for providing the game to the user includes allowing the application provider to access certain types of data from the user, such as shopping habits or device location. The game thus provides incentive for the user to allow their data to be used as crowdsourced data for whatever purposes the provider has agreed to.

In some cases, there are data aggregators in between the group of individuals who collect the data through crowd-sourcing and the entity training the machine learning model based on that data. In those cases, the entity training the machine learning model can consider that data aggregator as a single data contributor for purposes of compensation. Individual data contributors and data aggregators are collectively referred to herein as data contributors, and may be generally treated the same according to example embodiments described herein.

A supervised machine learning model may be trained on specific data items sourced from data contributors. A supervised machine learning model may learn the relations in the training data and associate the example inputs to the example outputs depending on the target use case. The model can generalize the relations, structures, and dependencies seen in the training data to new unseen cases when used after training.

A method, apparatus and computer program product are provided in accordance with an example embodiment in order to identify and compensate content/data contributors who contribute training data to a supervised machine learning model based on a value of the content provided by a contributor for use in training a neural network. The value of the content may be established based on how the content is used by the machine learning model in practice. Crowd sourcing of data enables the use of data sources that may be underutilized, as devices capable of generating data are now ubiquitous, and the functionality of these devices is ever increasing. As such, the ubiquity of devices capable of producing copious amounts of data provides vast volumes of data that can be accessed by developers or service providers for various purposes. Embodiments described herein may harvest crowd sourced data to train neural networks for various purposes. Using crowd sourced data from a wide variety of sources gathering data in a wide array of environments and conditions provides a broad range of data that can train a neural network efficiently and effectively.

To improve the availability of crowd sourced data, incentives may be used. Data privacy issues and data access issues, whether controlled by data sources themselves or through governmental regulation, may de-incentivize providing of data to a service provider, even if the data is fully anonymized. As such, the use of incentives may provide data sources with the motivation to allow captured data to be used in crowd sourcing initiatives for a variety of purposes. According to example embodiments described herein, the incentives may include payments to the data contributors or other rewards offered to contributors based on the usefulness or value of the data they provide. As data sources are readily available and virtually innumerable, compensating data contributors merely for providing permission to use crowd sourced data from the data source would be prohibitively expensive if the compensation is of monetary value. Further, as much of the crowd sourced data gathered may be redundant or provide little benefit, incentivizing of crowd sourced data merely based on the amount of data provided may not provide useful data while incurring substantial cost.

Embodiments described herein provide a mechanism to incentivize data sources to participate in crowd sourced data gathering while providing specific incentives that are proportional to the amount of useful data generated by a data contributor. Further, incentive payments may be made through micropayments based on the useful data provided by a data source using blockchain technology for distribution of the micropayments. Compensation or incentives for crowdsourced data may be relatively small payments. A machine learning model may be income generating, though each use of the machine learning model may generate only a very small amount of income, directly or indirectly. As such, payments for contributors who provided useful data for each use of the machine learning model may consequently be very small. Transactions on the order of fractions of a penny or lower than the smallest unit of currency typically exchanged in bank account transactions may make the processing of payments difficult. Further, conventional bank accounts may include transactional fees that render such small payments worthless. However, embodiments described herein use micropayments in a manner that can facilitate compensation for such transactions while not suffering the shortcomings of conventional bank transactions.

Micropayments may be used to make a large number of small transactions which would be inefficient or cost-prohibitive to perform as traditional bank account transfers or payments by check. An alternative or option for using micropayments may be to aggregate together a large number of small transactions before making an aggregated payment to the recipient when the sum of small transactions satisfies a specific value or based on a time interval, such as daily, weekly, monthly, etc. Aggregation of payments may become impractical when the number of payment recipients grows large as the sums paid become small compared to transaction fees, or the payment recipients are not clients of one or few payment processor institutions such as banks. Open blockchain cryptocurrencies, closed consortium blockchains, or specific payment processor partners can be used for micropayments.

In crowd-sourced data sourcing there are a large number of data contributors. When monetary or other rewards are being used to compensate, guide, and motivate the data gathering, it becomes important to attribute the data relevance and quality properly and fairly to individual data contributors.

Traditionally, rewards have been attributed to data contributors with schemes with either constant prices per some measure of collected data such as time span, spatial span, or number of individuals or per number of data items, or case-by-case contracts with data contributors. Attributing the data relevance and quality improperly to data contributors can reward the data contributors from activities which are not improving the machine learning models trained on this data, while de-incentivizing data contributors that may be providing valuable data for the machine learning models, but are being compensated less due to the volume of data being produced.

Machine learning models often generate some revenue directly or indirectly when used, or has some other utility which is a basis for rewarding the data contributors. Embodiments described herein direct more rewards to data contributors which have provided more meaningful data in terms of the machine learning model trained on that data.

Micropayments to data contributors may be performed by requiring the contributors to have access to cryptocurrency wallets (e.g., accounts) where the respective monetary amounts may be paid in amounts of the cryptocurrency. The micropayment transactions may be collected together and the payment may then materialize by submitting a properly signed transaction to the cryptocurrency blockchain network, where blockchain miners or validators incorporate that transaction into the consensus blockchain.

In the case of Bitcoin® and other cryptocurrencies, micropayments can be aggregated into one transaction which sources the monetary sum from a set of discrete Bitcoin coins A of arbitrary values managed by the paying entity, and transferring the value in those coins to a set of new coins $\{B_1, B_2, \ldots, B_k\}$ which should be set cryptographically accessible to k intended recipients, the excess money in the source coins which is left over may be set to new coins C owned by the sender, and the rest is by convention the part going into possible transaction fees D which materialize into new coins owned by the validator or the miner in the validation or mining process where the transaction is incorporated into the consensus blockchain. Coins A are destroyed by the transaction, and new coins $\{B_1, B_2, \ldots, B_k\}$, C, D are created so that their combined values are exactly equal. Each capital letter in this notation can correspond to zero or more discrete coins with arbitrary and separate values each. A transaction may be depicted as illustrated below in Equation 1:

$$A \to \{B_1, B_2, \ldots, B_k, C, D\}$$

$$\text{value}(A) = \text{value}(\{B_1, B_2, \ldots, B_k\}) + \text{value}(C) + \text{value}(D) \quad (1)$$

Conventional cryptocurrencies in public blockchains are transacted in the single main blockchain, and only the transactions incorporated into the main blockchain are considered as definitive. The main blockchain has to be, by necessity, stored by all the miners and validators in the network, and since it contains all the transactions over the whole history of the blockchain, it tends to grow very large. This is why there are several techniques to separate most of the transactions into sidechains or shards so that the space requirements of the blockchain do not form a significant bottleneck for scaling into large numbers of transactions. Off-chain scaling solutions for scaling transaction capabilities of public blockchains include, for example, Lightning for Bitcoin, and Plasma, Raiden, and Liquidity.Network for Ethereum.

Embodiments described herein provide a mechanism to attribute the machine learning model utility to data contributors to provide a fair and proper incentive/reward for contributing to the actual performance of the machine learning utility model. In particular, embodiments define the utility of the data based on its impact in the target use of a supervised machine learning model trained on crowd-sourced data, and to propose a system which performs fair and proper incentive/reward allocation and generates the payments to the relevant parties through micropayments.

Figure 1:
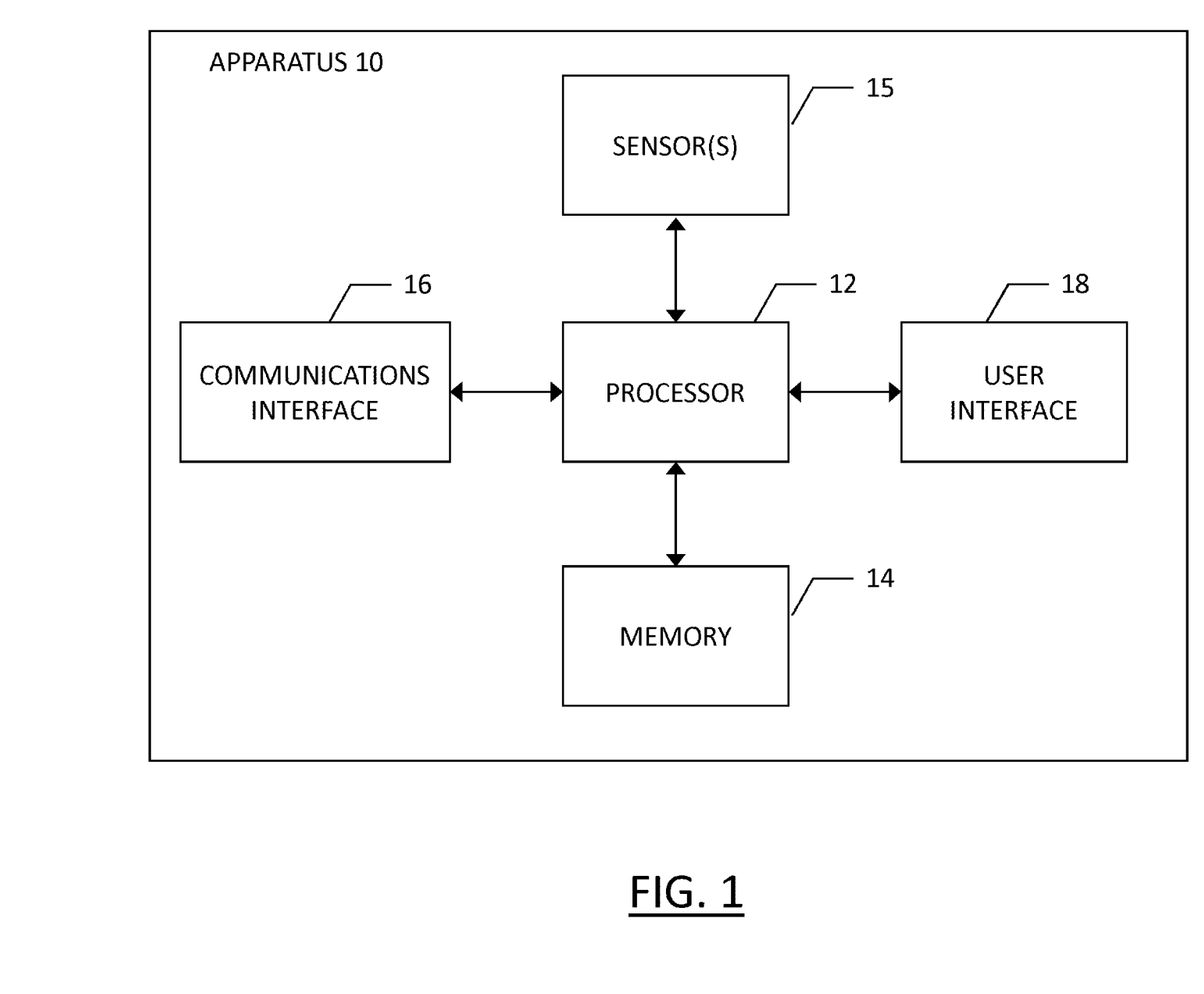
FIG. 1 is a block diagram of an apparatus according to an example embodiment of the present disclosure.

FIG. 1 depicts the apparatus 10 of an example embodiment that may be embodied by various computing devices that may be used for generating crowd-sourced data and/or receiving payment for contributing useful crowd-sourced data. The apparatus 10 therefore may function as a data contributor/data source for the supervised machine learning model. As shown, the apparatus 10 of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive sensor data from sensor(s) 15. The sensor(s) 15 may include any of a variety of sensors that may collect useful data, such as a global positioning system sensor/antenna, an image capture device, a microphone, an accelerometer or inertial measurement unit (IMU), a light distancing and ranging (LiDAR) sensor, etc. The communication interface may optionally include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide information to a user based on data received from a service provider. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Figure 2:
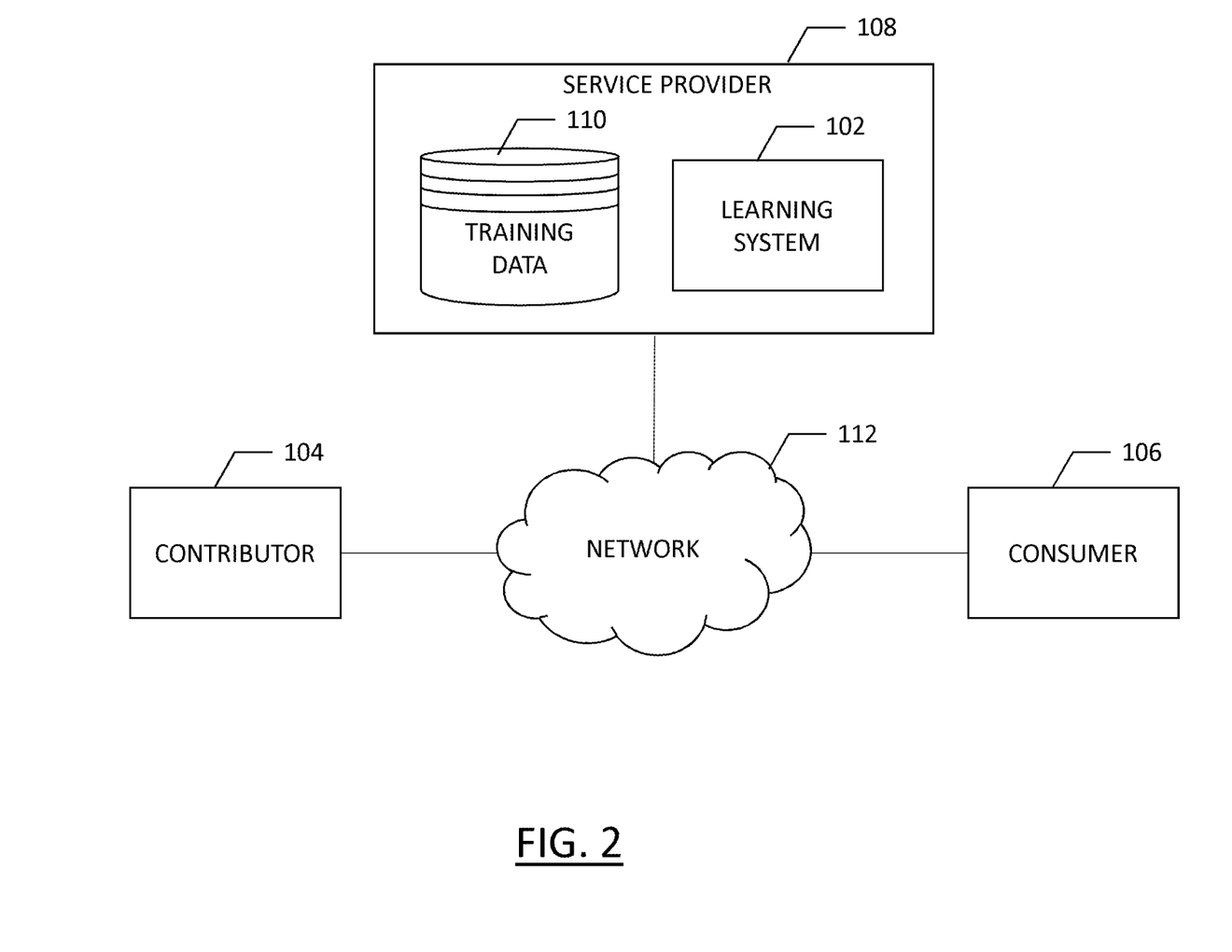
FIG. 2 is a block diagram of a system for providing crowd sourced data as a data contributor to a machine learning model according to an example embodiment of the present disclosure.

In example embodiments, a service provider may provide a service to a consumer. For example, the service provider may be a map data service provider while a consumer may include a user of a navigation device, as will be described further in an example embodiment below. FIG. 2 illustrates a communication diagram of an example embodiment of a system for implementing example embodiments described herein. The illustrated embodiment of FIG. 2 includes a contributor 104, which may be an apparatus 10 as described above with respect to FIG. 1, such as a mobile phone, an in-vehicle navigation system, or any device that may be capable of gathering and communicating data. Optionally, the contributor 1040 may be a web portal, capable of uploading data provided by a user. The contributor 104 may be in communication with a service provider 108 via network 112, which may be any form of a wireless or partially wireless network. The service provider 108 may implement the machine learning model as a learning system 102 using training data 110 stored in a database. A consumer 106 may communicate with the service provider 108 via network 112 to use the machine learning model to inform the consumer with respect to the service provided by the service provider.

Figure 3:
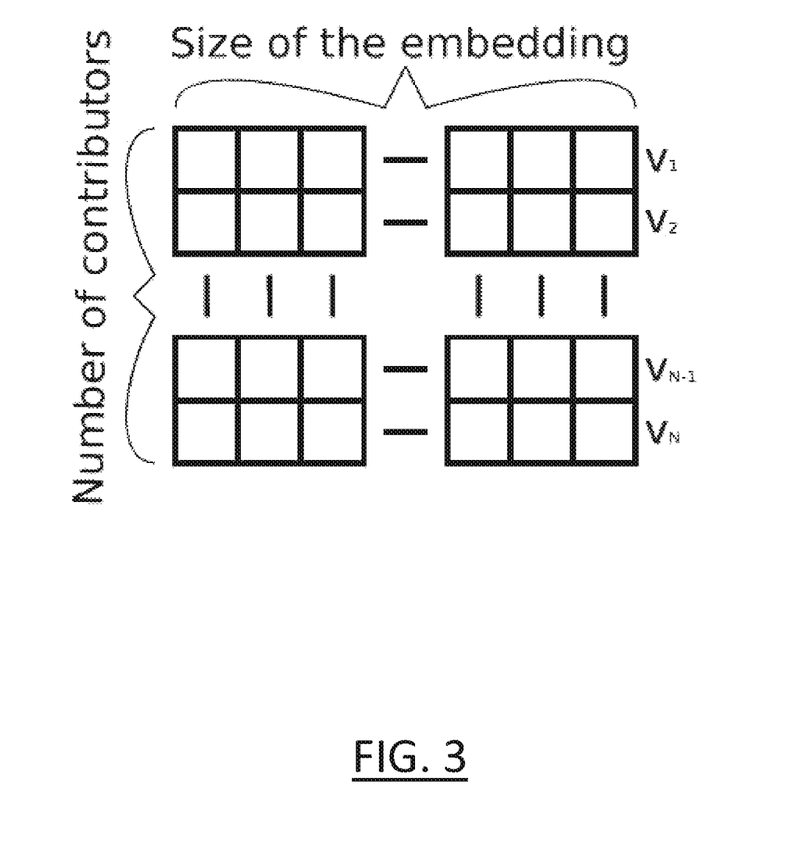
FIG. 3 illustrates an example matrix of contributor identifiers according to an example embodiment of the present disclosure.

In order to incentivize and compensate data contributors, the data contributors must be uniquely identified. The contributor identifiers may be one-hot encoded, or used as dense embeddings. Either way, the contributors may be represented as numerical arrays interpreted as vectors, as shown in FIG. 3. If multiple contributors relate to one data item, for example when one contributor has provided a photograph and another has provided labeling for the photograph, then the combination of these contributors may be assigned a separate contributor identifier. In FIG. 3, the contributors ($v_1, v_2, \ldots, v_N$) may be arranged on rows of the matrix, while the size of the embedding may be arranged on the columns of the matrix.

One-hot encoding is a process by which categorical variables are converted into a form that could be provided to machine learning algorithms to improve prediction. One-hot encoding of a contributor identifier is a vector $v_i$, where the index i is the contributor index, and N is the maximum number of contributors, defined in Equation (2) below. For one-hot encoding, the dictionary of contributor identifiers D is identity I.

$$i \in \mathcal{N}, 1 \leq i \leq N \qquad (2)$$
$$j \in \mathcal{N}, 1 \leq j \leq N$$
$$\left\{ v_{ij} \begin{cases} 1, \text{ if } j = i \\ 0, \text{ otherwise} \end{cases} \begin{aligned} v_i &= [v_{i,1}, v_{i,2}, \ldots, v_{i,N}] \\ D &= [v_1, v_2, \ldots, v_N] = I \end{aligned} \right.$$

A dense embedding of a size M can be formed by using a dictionary of randomly initialized vectors so that each row $v_i$ is the contributor identifier of that contributor i in the dictionary D. These contributor identifiers can be kept constant after random initialization, or they can be adapted throughout the training process in relation to back-propagated loss.

The dense embeddings are scaled so that their vector lengths are one. The dense embeddings are defined in Equation (3) and depicted in FIG. 3.

$$i \in \mathcal{N}, 1 \leq i \leq N \qquad (3)$$
$$j \in \mathcal{N}, 1 \leq j \leq N$$
$$u_i = [u_{i,1}, u_{i,2}, \ldots, u_{i,N}]$$
$$v_i = \frac{u_i}{\|u_i\|}$$
$$D = [v_1, v_2, \ldots, v_N]$$

One-hot encodings are orthogonal. If the size of the dense embedding of the contributor identifier is suitably large, we can assume they are approximately orthogonal, because high dimensional random vectors are approximately orthogonal. If dense embeddings are used, their sizes should be reasonably large, such as 128 dimensional embeddings. The loss can be propagated to the dense embedding dictionary to let the similar contributor embeddings migrate closer to each other and to let the dissimilar contributor embeddings migrate further away from each other during training.

Figure 4:
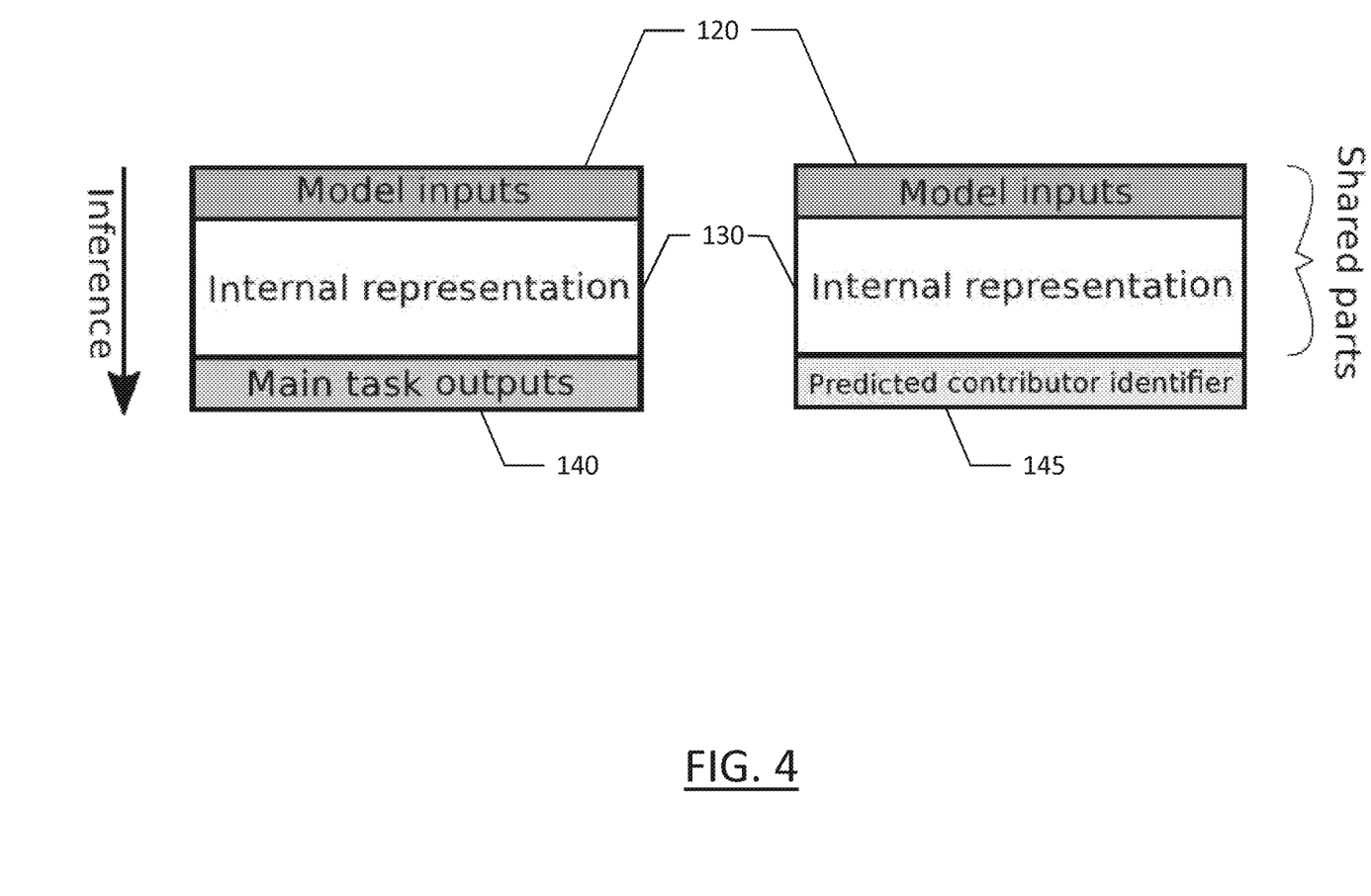
FIG. 4 illustrates the model sharing between two tasks for both generating a response and identifying a contributor according to an example embodiment of the present disclosure.

For training the supervised machine learning model, embodiments may form a parallel task for predicting the data contributor identifier in addition to the main task. The additional task may be for contributor reward/incentive assignment. That task has a goal of prediction from which contributor a specific training example came from. The contributor reward/incentive assignment may include a small predictor component which predicts the original contributor identifier based on internal representations of the main task model. The model sharing between two tasks is depicted in FIG. 4, described herein with reference to the computation graph of a machine learning model illustrated in FIG. 5. As shown, inference is performed when model inputs 120 (element 120 in FIG. 5) for the main task are entered into the machine learning sub-model (element 258 of FIG. 5) to obtain the model internal representation 130, to feed it to the output projection function (element 257 of FIG. 5) to obtain the main task outputs 140 (element 140 of FIG. 5). Similarly, the model inputs 120 are used in parallel to predict the data contributor using the same sub-model (element 258 of FIG. 5) and its internal representation 130, to feed it to the contributor identifier projection function (element 259 of FIG. 5), in order to output the predicted contributor identifier 145 (element 145 of FIG. 5). Note that the model inputs 120 are identical, as are the model internal representations 130.

Figure 5:
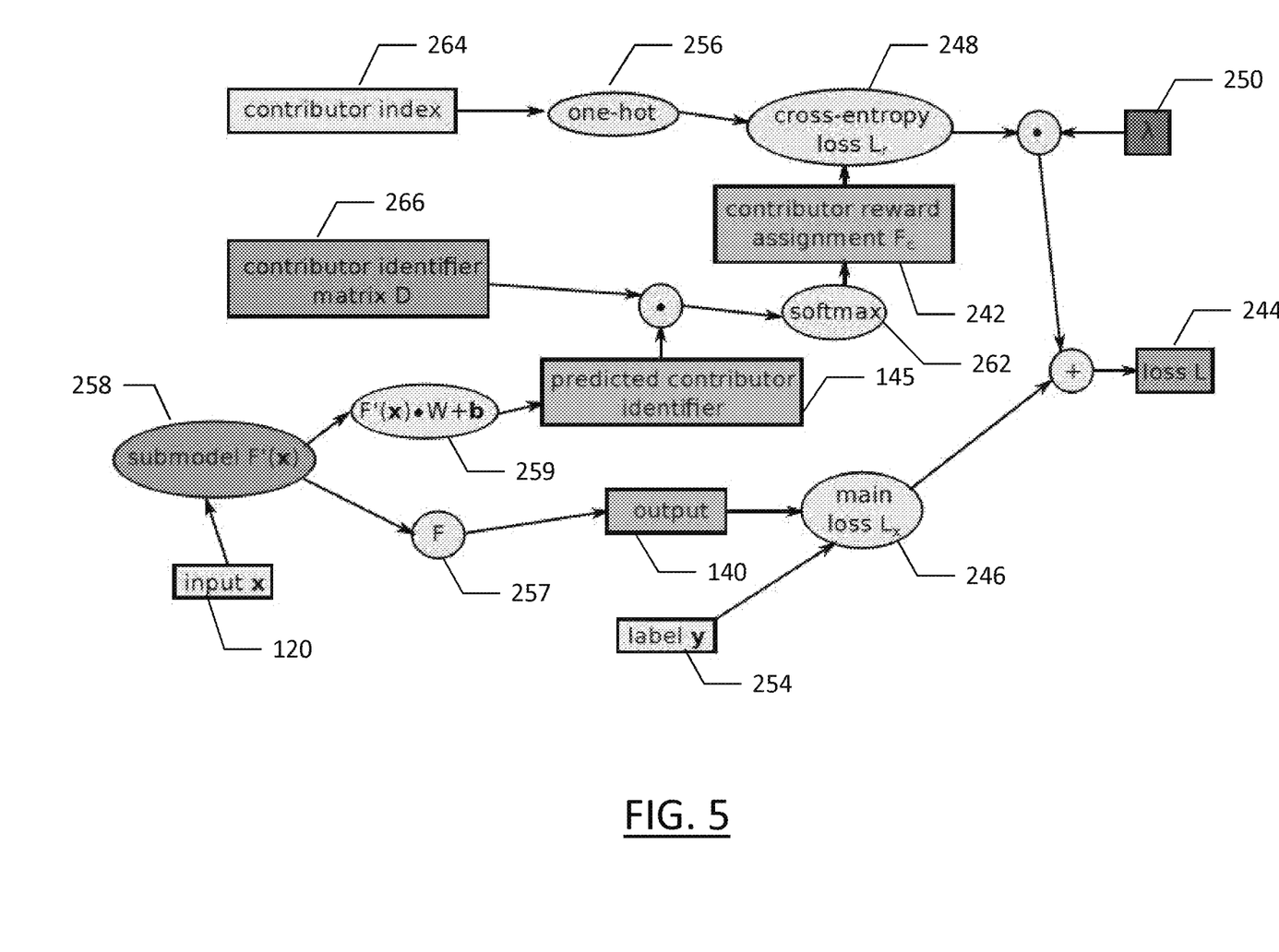
FIG. 5 illustrates a computation graph of using a machine learning model to generate a response to an input and to identify a contributor of data that was used for generating the response according to an example embodiment of the present disclosure.

In an instance of deep neural networks which are trained with stochastic gradient descent, the internal representations of the main task model may be the artificial neuron activations before the output layer for the main task. An example whole computation graph is illustrated in FIG. 5. Both the main task 258 and the contributor reward assignment task 242 are trained jointly so that the loss function L 244 is composed of the arbitrary main task loss function $L_x$ 246, and the contributor reward assignment loss function $L_r$ 248 scaled by a factor of $\lambda$ 250. The scale factor $\lambda$ 250 is chosen to balance the two losses in training and it is a positive real value chosen arbitrarily. The contributor index 264 the data contributor identifier that has provided the training data item to the supervised machine learning model. The predicted contributor identifier 268 may be output by the model in parallel processing as shown in FIG. 4.

The loss depends on the example data where x 120 is the input data, y 254 is the main task target label or output, $y_c$ is the one-hot 256 contributor identifier for the training case, F'(x) 258 is the shared internal representation of the models, F(F'(x)) is the main task output 140, and $F_c$(F'(x)) is the contributor reward assignment 242 output, as shown in Equation 4.

$$\lambda \in \mathcal{R}, \lambda > 0$$

$$L(F(F'(x)),F_c(F'(x),D),y,y_c) = L_x(F(F'(x)),y) + \lambda \times L_r(F_c(F'(x),D),y_c) \quad (4)$$

The loss $L_r$ is computed with plain cross entropy loss or some other cross entropy based loss. The last operation in the $F_c(\bullet, D)$ function is a softmax 262. Softmax is defined in the Equation 5, and scales the output components to be positive and sum up to one.

$$\text{softmax}(\xi)_i = \frac{e^{\xi_i}}{\sum_{k=1}^{N} e^{\xi_k}} \quad 1 \leq i \leq N, i \in i \in \mathcal{N}, \xi \in \mathcal{R}^N \quad (5)$$

The final projection is defined from the model internal representation F'(x) to the estimated contributor identifier output as a linear mapping with a learned matrix of weights W and learned biases b in Equation 6.

$$W \in \mathcal{R}^{\cdot \times M}$$

$$b \in \mathcal{R}^M$$

$$F'_c(F'(x)) = F'(x) \cdot W + b \quad (6)$$

Before softmaxing at 262, the contributor identifier output 145 is projected into the dictionary of contributor identifiers D 266. Note that for one-hot encodings, D=I. The $F_c(\bullet)$ contributor reward function is defined as a projection to the vector representations of each contributor identifier in the contributor identifier directory D 266, resulting in a vector of contributor weights. These contributor weights are softmaxed to scale them so that they are zero or larger and sum to one, producing the final reward assignment vector $F_c$(x, D) shown in Equation 7.

$$F_c(x, D) = \text{softmax}(F'_c(x) \cdot D) \quad (7)$$

The reward assignment vector expresses the expected weighted contribution each data contributor had in training data cases which most resembled the use time situation. This vector is multiplied with the total reward amount t, which produces the reward amounts vector r for each contributor shown in Equation 8.

$$r = F_c(x, D) \times t \quad (8)$$

The system may propagate the amounts of normalized value through the same machine learning model which was used to provide the service. This allows the monetary values to be weighted with the same information pathways, as was used in the system producing the service. A machine learning model should associate different kinds of new situations to specific training data contributors. In particular, this allows assigning credit for the inference executed by a machine learning model as a weighted sum to specific individuals whose data contribution was the most impactful in training the neural network so that those people whose data was the most significant get credited more of the rewards.

In the case of a deep neural network, the contributor reward assignment may be computed based on the same model which is used to perform the main task, and most of the model parameters are shared between the two sub-models, as shown in FIG. 4. In a deep neural network, the firing of a neuron corresponds to sending signals to connected neurons in the layer above. During deep learning, connections in the network may be strengthened or weakened based on the training data received. When training data is fed into a network, each artificial neuron that fires transmits signals to certain neurons in the next layer, which may then fire, particularly if multiple signals are received. This artificial neuron firing builds the deep learning network through patterns of fired neurons and their interconnectivity. As such, similar data fed into the deep neural network will generate a similar pattern of neurons firing along the same pathways between neurons. If a data contributor's training data has been largely responsible for the situation where the internal activations of the neural network resemble the same activations in use time, that pattern of activations is associated to that same contributor fairly by the contributor reward assignment projection layer. For example, in response to a model input, a specific set or pattern of neurons of a machine learning model may fire to generate the inference or response to the input. That specific set or pattern of neurons may correspond to the neurons that fired in response to a certain contributor or set of contributors training data. In such a case, the neuron fingerprint of the model response may be correlated with the neuron fingerprint of the training data to establish the contributors responsible for the data used to generate the model response.

If multiple data contributors' data have been significantly impactful in the usage time situation, then the contributor reward assignment model may output a representation which is in between the respective contributor identities which leads to the reward being fairly divided between several contributors in respect to their relative relevance.

Figure 6:
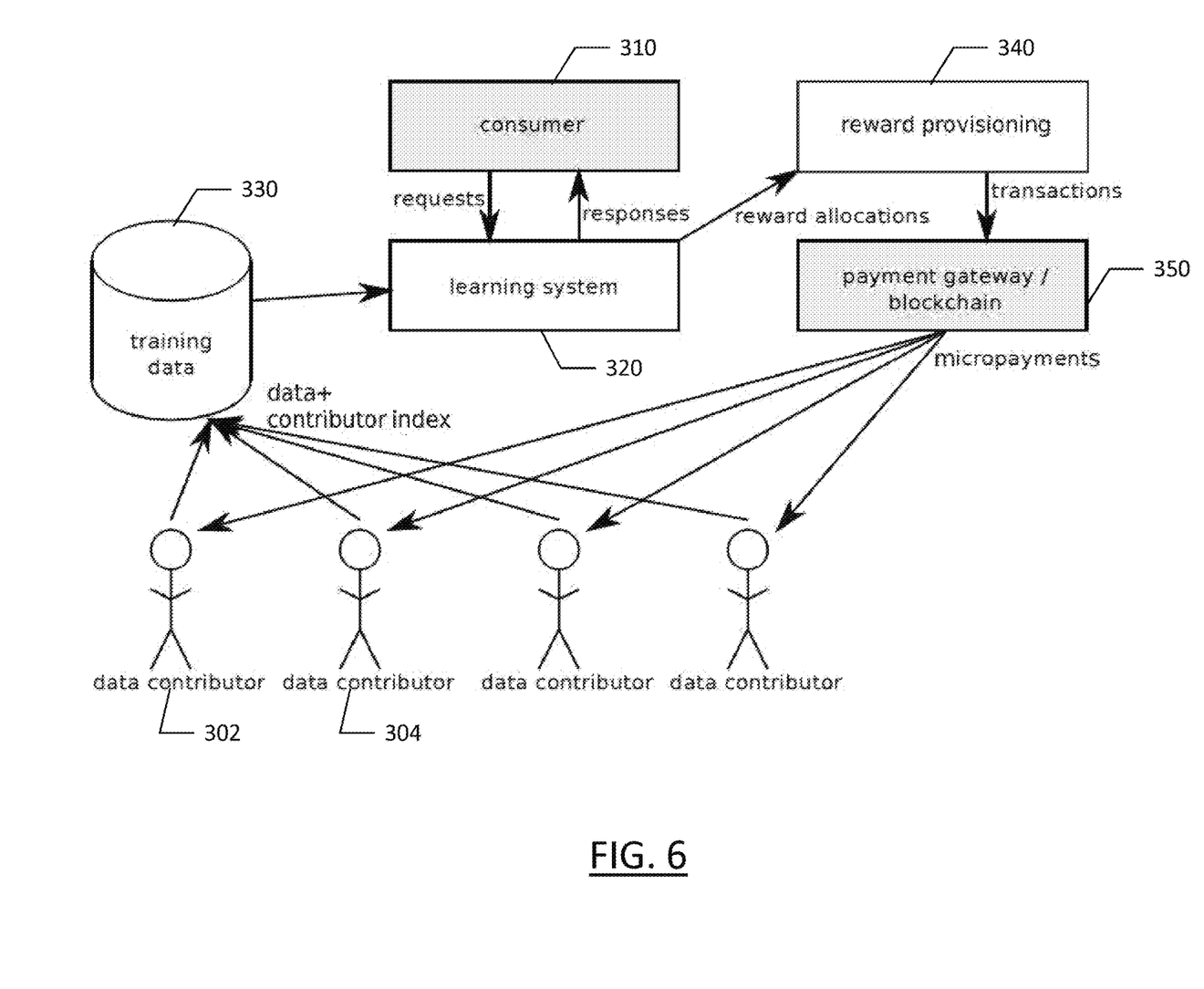
FIG. 6 depicts the message flow diagram for training a machine learning model and using the machine learning model to generate a response and provide compensation for the contributors of the training data according to an example embodiment of the present disclosure.

FIG. 6 illustrates the relations of different components of the system to external components. The value for paying out the micropayments r may be stored in a cryptocurrency wallet, accessible by the reward provisioning module sending the payment transactions to the payment gateway or payment processing network in the case of blockchain. The payments may be sent by using a centralized payment processor service where the payer and the contributors have accounts, a consortium blockchain where a trusted set of participants achieve an executed transaction sequence consensus by means of fast consensus algorithms for networks of limited participation, or using a public blockchain cryptocurrency.

In the case of a centralized payment processor or a payment network consisting of a consortium blockchain, the payer can integrate the suitable electronic interfaces offered by those services to send payments to contributors. In the case of a public blockchain cryptocurrency, the payments may either be aggregated together over some duration of time before actually committing the transactions to the blockchain, to reduce the required capacity in the main blockchain, or alternatively, off-chain transaction or sharding solutions available on the target blockchain may be used to enable scaling to the numbers of micropayment transactions required for the application in question.

According to an example embodiment described herein, there may be two contributors who contribute different kinds of materials to the training database. One of these contributors, Contributor A (e.g., data contributor 302 in FIG. 6), has provided labelled photographic pictures taken from car-mounted cameras showing other cars and road users in different situations. The other contributor, Contributor B (e.g., data contributor 304 in FIG. 6), has provided photographic pictures taken from a sidewalk with a mobile phone, labelled similarly, but showing mostly pedestrians and bicyclists. A system may be trained using this data to detect vehicles, using the training scheme defined herein. When used, this trained system may produce some value, a part of which may be assigned to the contributors fairly based on each contributor's contribution. For example, a value may be assigned to contributors in proportion to the relative contribution of each contributor to the data in the training database. For example, the trained system may be part of a navigational system that was purchased by a consumer or requires a subscription, whereby the identification of objects in an environment or an ability to identify a location based on an image is a feature of the navigational system.

A consumer of the system, such as consumer 106 of FIG. 2 or 310 of FIG. 6, may submit a photograph as a "request" for vehicle detection to the system 320. This photograph may be from a car-mounted camera (e.g., sensor 15 of FIG. 1), and thus may resemble the training materials in training data 330 submitted by Contributor A. The system evaluates the most likely contributor to be Contributor A 302, and micropayments are assigned mostly to Contributor A 302. The micropayments are assigned through reward provisioning 340 and paid through the payment gateway/blockchain 350.

Another consumer 310 submits a photograph as a request for vehicle detection to the system. This photograph is also taken by a car-mounted camera, but contains a bicycle. The system infers that the detected vehicle is a bicycle, and it has mostly learned the internal representations for bicycles from the Contributor B 304 data. However, the angle and the perspective of the camera mostly resembles the Contributor A 302 data, and that allows the system to understand the background of the bicycle better, in turn improving the detection confidence of the bicycle. The system 320 determines that both contributors provided value-added data for the inference, such that reward provisioning 340 assigns some amount of reward to Contributor A 302 and some amount of reward to Contributor B 304. The micropayments may be divided to the two contributors accordingly by reward provisioning 340 and distributed by the payment gateway 350.

Contributors of training data may not always be uniquely identified from machine learning models described herein. For example, a request from a consumer 310 may include an image including a plurality of features that do not necessarily correlate identically with features of a specific training data contributor's images. However, the image may be within a predefined degree of similarity of images provided by one or more training data contributors. In such an instance, the predefined similarity may be based on a similarity that is sufficient that the training data from the contributor may be used to provide a response to the request. In other cases, the training data may be used in conjunction with other training data or with other machine learning models. In such an instance, the contributors of the training data that is within a predefined degree of similarity may be provided compensation based on an indication that the contributors facilitated the response to the request to some degree.

Figure 7:
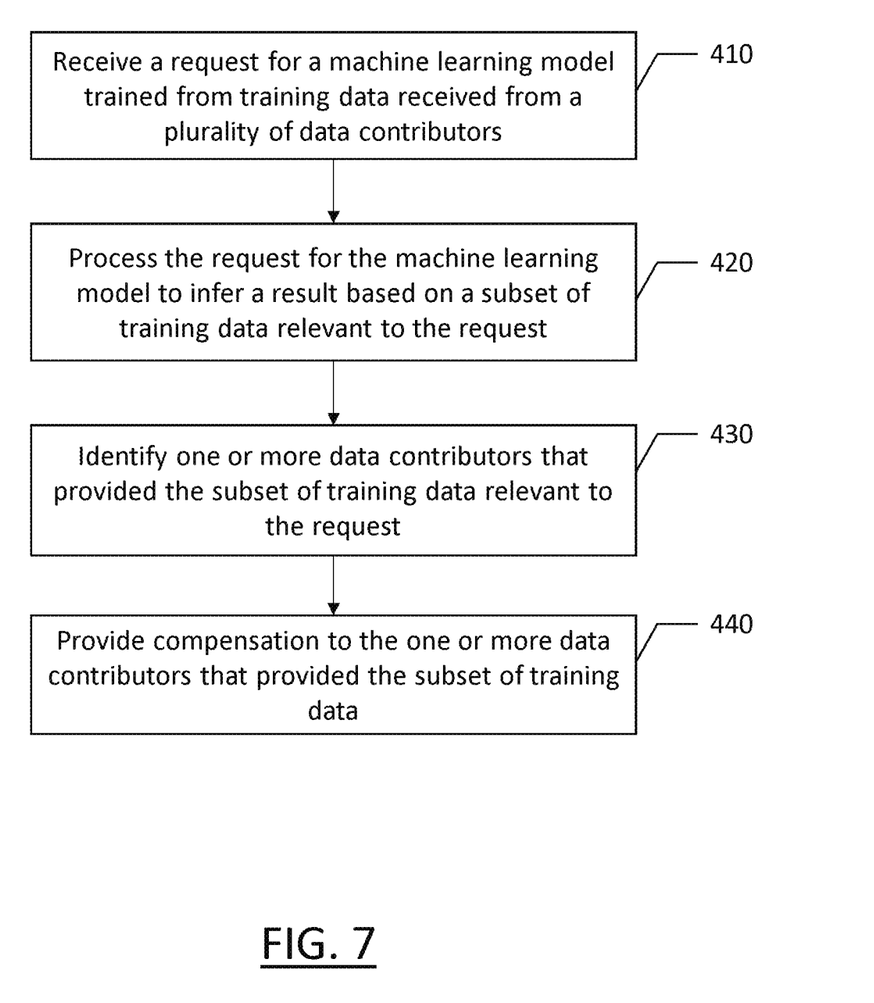
FIG. 7 is a flowchart for identifying contributors of training data used to generate a response in a machine learning model according to an example embodiment of the present disclosure.

FIG. 7 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to the example embodiment of FIG. 7, a request for a machine learning model is received, where the machine learning model is trained from training data received from a plurality of contributors, where the training data identified a contributor having provided the respective training data. At 420, the request is processed for the machine learning model to infer a result based on a subset of training data that is relevant to the request. Not all training data used to train the machine learning model is relevant to each request. As such, only a subset of the training data may have facilitated the response. One or more data contributors that provided the subset of training data relevant to the request is identified at 430, while compensation is provided to the one or more data contributors that provided the subset of training data at 440.

In an example embodiment, an apparatus for performing the method of FIG. 3 above may comprise a processor (e.g., the processor 12) configured to perform some or each of the operations (410-440) described above. The processor may, for example, be configured to perform the operations (410-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-440 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. An apparatus including at least one processor and at least one non-transitory memory including computer program code instructions, the computer program code instructions configured to, when executed, cause the apparatus to at least:
   receive a request for a machine learning model trained from training data received from a plurality of data contributors, wherein the training data comprises information identifying a plurality of contributors having provided the training data;
   process the request for the machine learning model to infer a result based on a subset of the training data relevant to the request, wherein the subset of the training data relevant to the request comprises training data that facilitated the result of the request;
   identify one or more data contributors of the plurality of data contributors that provided the subset of the training data relevant to the request; and
   determine compensation to be provided to the one or more data contributors that provided the subset of the training data.

2. The apparatus of claim 1, wherein causing the apparatus to identify the one or more data contributors who provided the subset of the training data relevant to the request comprises causing the apparatus to:
   identify one or more data contributors who provided the subset of the training data relevant to the request; and
   identify a proportion of the subset of the training data that each of the identified one or more data contributors provided.

3. The apparatus of claim 2, wherein causing the apparatus to determine compensation to be provided to the one or more data contributors who provided the subset of the training data comprises causing the apparatus to:
   identify a value of the inferred result;
   identify a portion of the value for distribution to the one or more identified data contributors; and
   provide for distribution of the portion of the value for distribution proportionally to the one or more identified data contributors based on a proportion of the subset of the training data that each of the identified one or more data contributors provided.

4. The apparatus of claim 3, wherein a remainder of the value after distribution of the portion of the value for distribution is provided to at least one of transaction fees or a service provider of the machine learning model.

5. The apparatus of claim 1, wherein compensation is provided in micro-transactions via cryptocurrency, wherein micro-transactions comprise transactions at a fraction of a unit of the cryptocurrency.

6. The apparatus of claim 5, wherein causing the apparatus to determine compensation to be provided to the one or more data contributors who provided the subset of training data comprises causing the apparatus to:
aggregate micro-transactions; and
provide for distribution of the aggregated micro-transactions in response to the aggregate total of the micro-transactions satisfying a predetermined value.

7. The apparatus of claim 1, wherein the apparatus is further caused to record compensation to the one or more data contributors by blockchain ledger.

8. A computer program product comprising at least one non-transitory computer-readable storage medium having computer-executable program code portions stored therein, the computer-executable program code portions comprising program code instructions configured to:
receive a request for a machine learning model trained from training data received from a plurality of data contributors, wherein the training data comprises information identifying a plurality of contributors having provided the training data;
process the request for the machine learning model to infer a result based on a subset of the training data relevant to the request, wherein the subset of the training data relevant to the request comprises training data that facilitated the result of the request;
identify one or more data contributors of the plurality of data contributors that provided the subset of the training data relevant to the request; and
determine compensation to be provided to the one or more data contributors that provided the subset of the training data.

9. The computer program product of claim 8, wherein the program code instructions to identify the one or more data contributors that provided the subset of the training data relevant to the request comprises program code instructions to:
identify one or more data contributors who provided the subset of the training data relevant to the request; and
identify a proportion of the subset of the training data that each of the identified one or more data contributors provided.

10. The computer program product of claim 9, wherein the program code instructions to determine compensation to be provided to the one or more data contributors who provided the subset of the training data comprises program code instructions to:
identify a value of the inferred result;
identify a portion of the value for distribution to the one or more identified data contributors; and
provide for distribution of the portion of the value for distribution proportionally to the one or more identified data contributors based on a proportion of the subset of the training data that each of the identified one or more data contributors provided.

11. The computer program product of claim 10, wherein a remainder of the value after distribution of the portion of the value for distribution is provided to at least one of transaction fees or a service provider of the machine learning model.

12. The computer program product of claim 8, wherein compensation is provided in micro-transactions via cryptocurrency, wherein micro-transactions comprise transactions at a fraction of a unit of the cryptocurrency.

13. The computer program product of claim 8, wherein the program code instructions to determine compensation to be provided to the one or more data contributors who provided the subset of training data comprises program code instructions to:
aggregate micro-transactions; and
provide for distribution of the aggregated micro-transactions in response to the aggregate total of the micro-transactions satisfying a predetermined value.

14. The computer program product of claim 8, further comprising program code instructions to record compensation to the one or more data contributors by blockchain ledger.

15. A method comprising:
receiving a request for a machine learning model trained from training data received from a plurality of data contributors, wherein the training data comprises information identifying a plurality of contributors having provided the training data;
processing the request for the machine learning model to infer a result based on a subset of the training data relevant to the request, wherein the subset of the training data relevant to the request comprises training data that facilitated the result of the request;
identifying one or more data contributors of the plurality of data contributors that provided the subset of the training data relevant to the request; and
determining compensation to be provided to the one or more data contributors that provided the subset of the training data.

16. The method of claim 15, wherein identifying the one or more data contributors who provided the subset of the training data relevant to the request comprises:
identifying one or more data contributors who provided the subset of the training data relevant to the request; and
identifying a proportion of the subset of the training data that each of the identified one or more data contributors provided.

17. The method of claim 16, wherein determining compensation to be provided to the one or more data contributors who provided the subset of the training data comprises:
identifying a value of the inferred result;
identifying a portion of the value for distribution to the one or more identified data contributors; and
providing for distribution of the portion of the value for distribution proportionally to the one or more identified data contributors based on a proportion of the subset of the training data that each of the identified one or more data contributors provided.

18. The method of claim 17, wherein a remainder of the value after distribution of the portion of the value for distribution is provided to at least one of transaction fees or a service provider of the machine learning model.

19. The method of claim 15, wherein compensation is provided in micro-transactions via cryptocurrency, wherein micro-transactions comprise transactions at a fraction of a unit of the cryptocurrency.

20. The method of claim 15, wherein determining compensation to be provided to the one or more data contributors who provided the subset of training data comprises:
aggregating micro-transactions; and
providing for distribution of the aggregated micro-transactions in response to the aggregate total of the micro-transactions satisfying a predetermined value.

\* \* \* \* \*